(12) United States Patent
Lee et al.

(10) Patent No.: US 9,207,127 B2
(45) Date of Patent: Dec. 8, 2015

(54) INFRARED DETECTOR

(71) Applicant: Korea Advanced Institute of Science & Technology, Daejeon (KR)

(72) Inventors: Kwyro Lee, Daejeon (KR); Minsik Kim, Daejeon (KR); Jinhyeok Baek, Daejeon (KR); Seunghyun Park, Daejeon (KR)

(73) Assignee: Korea Advanced Institute of Science & Technology, Daejeon (KR)

( * ) Notice: Subject to any disclaimer, the term of this patent is extended or adjusted under 35 U.S.C. 154(b) by 0 days.

(21) Appl. No.: 14/193,639

(22) Filed: Feb. 28, 2014

(65) Prior Publication Data

US 2015/0241283 A1    Aug. 27, 2015

(30) Foreign Application Priority Data

Feb. 27, 2014    (KR) .................. 10-2014-0023336

(51) Int. Cl.
*G01J 5/00*    (2006.01)
*G01J 5/10*    (2006.01)

(52) U.S. Cl.
CPC ........................... *G01J 5/10* (2013.01)

(58) Field of Classification Search
CPC .................. G01J 5/0853; G01J 5/10
USPC ....................................... 250/338.1
See application file for complete search history.

(56) References Cited

U.S. PATENT DOCUMENTS

| | | | |
|---|---|---|---|
| 5,760,398 A * | 6/1998 | Blackwell et al. | 250/332 |
| 6,426,539 B1 * | 7/2002 | Vilain et al. | 257/425 |
| 7,435,964 B2 * | 10/2008 | Lane et al. | 250/346 |
| 2001/0003356 A1 * | 6/2001 | Yon et al. | 250/338.1 |
| 2006/0060786 A1 * | 3/2006 | Vilain | 250/338.1 |
| 2006/0124831 A1 * | 6/2006 | Schimert et al. | 250/214 R |
| 2007/0120058 A1 * | 5/2007 | Blackwell et al. | 250/338.1 |
| 2007/0170359 A1 * | 7/2007 | Syllaios et al. | 250/338.1 |
| 2007/0170360 A1 * | 7/2007 | Gooch et al. | 250/338.1 |
| 2007/0170363 A1 * | 7/2007 | Schimert et al. | 250/353 |
| 2009/0321644 A1 * | 12/2009 | Vogt et al. | 250/338.4 |
| 2011/0266443 A1 * | 11/2011 | Schimert et al. | 250/338.4 |
| 2011/0266445 A1 * | 11/2011 | Beratan | 250/338.4 |
| 2012/0097853 A1 * | 4/2012 | Ouvrier-Buffet et al. | 250/349 |
| 2012/0211657 A1 * | 8/2012 | Dupont et al. | 250/338.1 |
| 2013/0240738 A1 * | 9/2013 | Yon et al. | 250/349 |
| 2014/0091220 A1 * | 4/2014 | Li | 250/340 |
| 2014/0231651 A1 * | 8/2014 | Kim et al. | 250/349 |

* cited by examiner

*Primary Examiner* — David J Makiya
*Assistant Examiner* — Taeho Jo
(74) *Attorney, Agent, or Firm* — Foley & Lardner LLP

(57) ABSTRACT

An infrared detector may be provided that includes: a micro-bolometer active cell which detects infrared and outputs a current signal; and a reference cell which includes a plurality of connected warm cells having the same structure and electrical characteristics as those of the micro-bolometer active cell, has the same electrical resistance value and average self-heating amount as those of the micro-bolometer active cell, and generates a reference current signal for the micro-bolometer active cell.

18 Claims, 5 Drawing Sheets

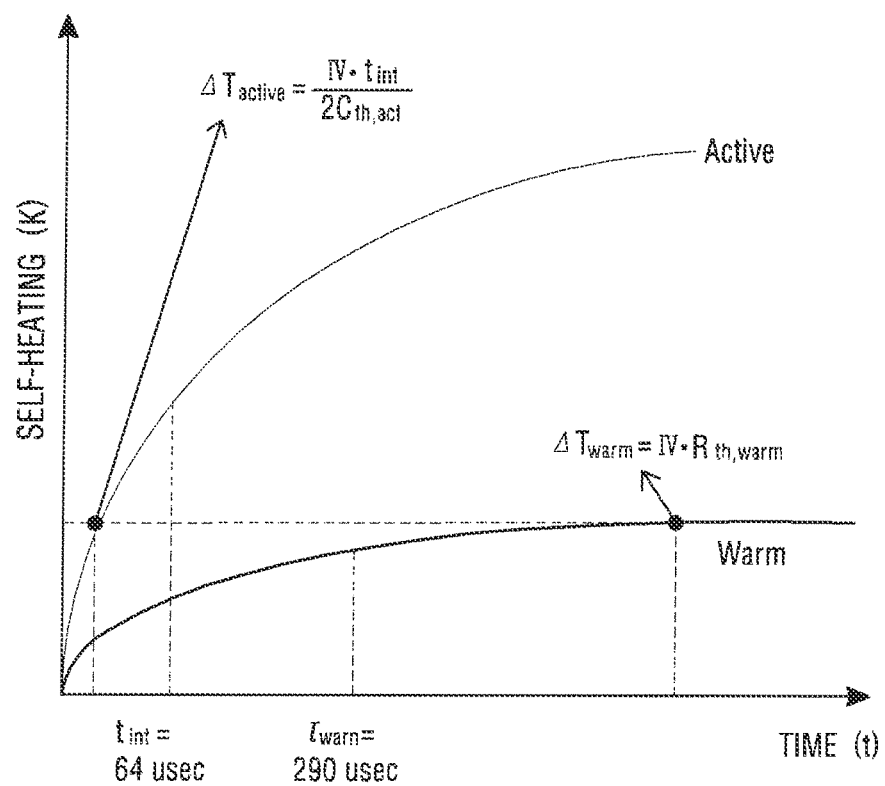

INFRARED DETECTOR

CROSS-REFERENCE TO RELATED APPLICATIONS

This application claims the benefit of Korean Patent Application No. 10-2014-0023336, filed on Feb. 27, 2014, the contents of which are hereby incorporated by reference in their entirety into the present disclosure.

BACKGROUND

1. Field

The present invention relates to an infrared detector and more particularly to a technology for optimizing fixed pattern noise, 1/f noise, matching and self-heating effect compensation characteristics of a micro-bolometer in an infrared detector including a micro-bolometer array.

2. Description of Related Art

An infrared detector is generally classified into a thermal-based detector and a light-based detector which responds to far-infrared radiation. The thermal-based detector is able to implement an image system for generating a temperature image of an object by using a thermal sensor array. As described above, an apparatus for obtaining the temperature image of the object by collecting black body radiation energy radiated from the object is designated as a far-infrared thermal imaging system.

It has been known that the thermal-based detector includes a bolometer, a micro-bolometer, pyroelectricity, and thermofile. When far-infrared in a band of 8~14 μm which is black body radiated from every object is collected on the micro-bolometer by means of a lens, the temperature of the micro-bolometer rises/falls, and as a result, the electrical resistance of the micro-bolometer is changed. Therefore, it becomes possible to image the temperature distribution of a scene of the captured object in a remote manner by measuring the electrical resistance value of an array of the micro-bolometer active cell, that is, a micro-bolometer array.

While the micro-bolometer array has generally a signal size according to the resistance change less than 0.1% caused by a thermal image, it has substrate temperature dependency, that is, the change amount of 2 to 3% of the signal size per one degree of the substrate temperature and has a so-called fixed pattern noise (FPN) according to process non-uniformity of several % and circuit mismatch of several %. Therefore, it is a big problem of how to remove the FPN much larger than the signal caused by the thermal image.

In addition to this, in order to obtain the result according to the temperature change of an electrical resistive element, it is required to measure current flowing through the electrical resistive element after applying a bias voltage to the electrical resistive element, or to measure voltage applied to both ends of the resistive element after applying current bias to the electrical resistive element. Here, the temperature of the electrical resistive element rises by joule-heating. Such a phenomenon is called self-heating. This should be corrected which is irrelevant to far-infrared radiation to be detected.

The 1/f noise that the electrical resistive element of the micro-bolometer has is an important factor determining the performance of the infrared detector. The 1/f noise is required to be reduced. Consequently, the micro-bolometer array becomes to have very big fixed pattern noise (FPN) caused by process/temperature/self-heating/1/f noise (PTSF) variation.

Accordingly, in the infrared detector including the micro-bolometer array, a variety of researches are being conducted to improve the infrared detection performance by reducing the FPN characteristics and 1/f noise characteristics and by compensating the self-heating effect.

SUMMARY

One embodiment is an infrared detector that includes: a micro-bolometer active cell which detects infrared and outputs a current signal; and a reference cell which includes at least one warm cell having the same electrical characteristics as that of the micro-bolometer active cell and further includes a heat transfer material in a structure of the micro-bolometer active cell, and generates a reference current signal for the micro-bolometer active cell.

Another embodiment is an infrared detector that includes: a micro-bolometer active cell which detects infrared and outputs a current signal; and a reference cell which includes a plurality of connected warm cells having the same structure and electrical characteristics as those of the micro-bolometer active cell, has the same electrical resistance value and average self-heating amount as those of the micro-bolometer active cell, and generates a reference current signal for the micro-bolometer active cell.

BRIEF DESCRIPTION OF THE DRAWINGS

FIG. 7 is a graph showing time-dependent temperature change from a point of time when a direct current voltage is applied to the reference cell and the micro-bolometer active cell according to the embodiment of the present invention.

DETAILED DESCRIPTION

Figure 1:
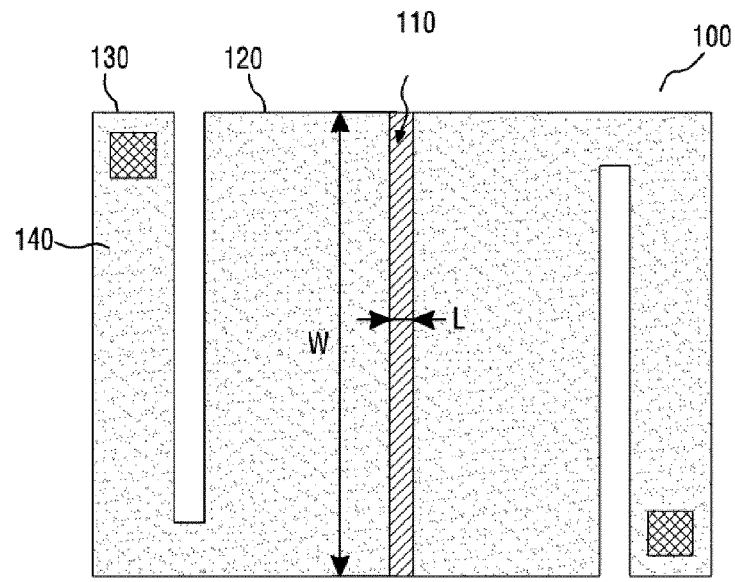
FIG. 1 shows a structure of a general micro-bolometer active cell.

Hereafter, an exemplary embodiment of the present invention will be described in detail with reference to the accompanying drawings. Here, the embodiment of the present invention can be variously transformed, and the scope of the present invention is not limited to the following embodiment. The shapes and sizes of the components in the drawings may be exaggerated for clarity of the description. It is noted that the same reference numerals are used to denote the same elements throughout the drawings. In the following description of the present invention, the detailed description of known functions and configurations incorporated herein is omitted when it may make the subject matter of the present invention unclear.

In general, a micro-bolometer array included in an infrared detector has generally a current change of several % due to process/temperature/self-heating (PTS). However, contrary to this, the minimum signal level caused by far-infrared from an object has a current change of about 0.001%. Therefore, in order that the signal according to the far-infrared from the object is read by the micro-bolometer array, a skimming method for removing an unnecessary DC bias is applied by using a reference cell.

However, even though the skimming method is used, an additional offset/gain calibration is required due to gain non-linearity and a residual offset caused by mismatch between a micro-bolometer active cell and the reference cell.

Accordingly, there is a need to improve matching characteristics between the micro-bolometer active cell and the reference cell as well as to reduce fixed pattern noise (FPN) and 1/f noise of the micro-bolometer active cell and the reference cell. Further, self-heating effect between the active cell and the reference cell is required to be compensated.

Hereafter, the present invention for achieving the above-mentioned objects will be described in detail.

FIG. 1 shows a structure of a general micro-bolometer active cell. As shown in FIG. 1, a micro-bolometer active cell 100 may include a body 120, two legs 140 extending respectively from both ends of the body 120, and an anchor 130 attached respectively to the ends of the two legs 140.

Here, the body 120 is comprised of an infrared absorber, so that the temperature of the body 120 rises/falls depending on the absorption of far-infrared. The leg 140 and the anchor 130 fix the micro-bolometer active cell 100 to a substrate (not shown) and function to separate the body 120 from the substrate, thereby preventing absorbed heat from flowing to the outside.

The micro-bolometer active cell 100 further includes an electrical resistive element 110 shown in FIG. 1. When the far-infrared is collected in the micro-bolometer active cell 100, the temperature of the infrared absorber rises/falls, and thus, the temperature of the electrical resistive element 110 rises/falls. The resistance value of the general electrical resistive element becomes less with the increase of the temperature. Therefore, the temperature of the object can be detected by measuring voltage/current applied to both ends of the electrical resistive element 110.

As shown in FIG. 1, with regard to the length L and width W of the electrical resistive element 110 of the general micro-bolometer active cell 100, the resistance value of the electrical resistive element 110 is proportional to L/W, and the area of the electrical resistive element 110 corresponds to L*W. In the micro-bolometer active cell 100 having the structure shown in FIG. 1, the area of the electrical resistive element 110 is very small, so that 1/f noise characteristics are bad. Since the electrical resistive element 110 is comprised of a single structure, it is very sensitive to a process error and has bad matching characteristics with other micro-bolometer active cell 100 or a warm cell 300.

Accordingly, the above-mentioned problems may be caused when the micro-bolometer active cell 100 included in the infrared detector, and the warm cell 300 generating a reference signal for removing the unnecessary DC bias current from the current signal from the corresponding micro-bolometer active cell are manufactured in a structure shown in FIG. 1.

Figure 2:
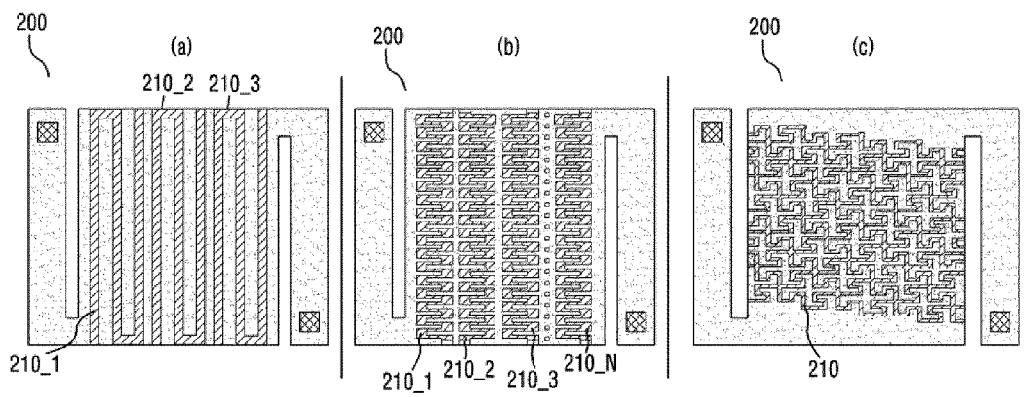
FIG. 2 shows a variety of shapes of a micro-bolometer active in accordance with an embodiment of the present invention.

FIG. 2 shows a variety of shapes of a micro-bolometer active cell 200 in accordance with the embodiment of the present invention. Though FIG. 2 shows that the micro-bolometer active cell 200 has been manufactured, the same structure can be applied to the warm cell 300.

As shown in FIG. 2, an electrical resistive element 210 of the active cell 200 according to the embodiment of the present invention may be formed in various patterns. In (a) to (c) of FIG. 2, it may be designed such that when the electrical resistive element 210 is formed of the same material as that of the electrical resistive element 110 shown in FIG. 1, the electrical resistive element 210 has the same resistance value (L/W) as that of the electrical resistive element 110 and has an area larger than that of the electrical resistive element 110. As a result, the active cell 200 maintains the electrical characteristics as they are of the cell formed in the conventional single structure of the length L and width W, and is able to reduce the 1/f noise. The size of the 1/f noise may be reduced with the increase of the volume or area of the electrical resistive element 210. Also, in the embodiment of the present invention, the electrical resistive element 210 is formed in a plurality of structures formed by repeating the single structure instead of the single structure, thereby reducing the influence of the process error and improving the matching characteristics with other cells. The pattern of the electrical resistive element 210 according to the embodiment of the present invention is not limited to the examples shown in (a) to (c) of FIG. 2.

The part (a) of FIG. 2 will be described first. The electrical resistive element 210 in (a) of FIG. 2 may be divided into three structures. The lengths and widths of a first structure to a third structure 210_1, 210_2 and 210_3 are equivalent to L and 3W respectively. Accordingly, the resistance value and area of the electrical resistive element 210 may be represented by 3L/3W and 9LW respectively. By doing this, the electrical resistive element 210 has the same resistance value and nine times the area, thereby reducing the 1/f noise to one-ninth times the 1/f.

The electrical resistive element 210 in (a) of FIG. 2 is configured by connecting in series and in parallel a plurality of the electrical resistive elements 110 of FIG. 1. Each of the first to third structures 210_1 to 210_3 is formed by connecting in parallel the three electrical resistive elements 110 of FIG. 1 and the first to third structures 210_1 to 210_3 are connected in series to each other. Each of the first to third structures 210_1 to 210_3 in (a) of FIG. 2 may be designated as a finger structure, and the electrical resistive element 210 formed by integrating them may be designated as a multi-finger structure.

When it is assumed that the number of the fingers included in each of the structures 210_1, 210_2 and 210_3 (that is, the number of the fingers which are connected in parallel) is N, the number of the structures forming the electrical resistive element 210 may be set to N. In this case, the area of the electrical resistive element 210 may increase $N^2$ times as much as that of the resistive element of the length L and width W. Thus, it is possible to improve resistance uniformity as much as N times statistically by use of total $N^2$ number of fingers as well as to reduce the 1/f noise to $1/N^2$. An example in a case where N=3 is shown in (a) of FIG. 2.

Referring to (b) of FIG. 2, the electrical resistive element 210 may include a plurality of the structures 210_1 to 210_N. What is shown in (b) of FIG. 2 may be a modified example of the multi-finger structure of the electrical resistive element 210 shown in (a) of FIG. 2. Each of the plurality of the structures 210_1 to 210_N in (b) of FIG. 2 may have a winding meander structure. The length of each of the plurality of the structures 210_1 to 210_N may be equivalent to L and the width may be represented by N*W due to the winding structure. Here, for the purpose of compensating for the resistance value reduction caused by the increase of the width from W to N*W, the electrical resistive element 210 may be comprised of N number of the structures 210_1 to 210_N. An effect obtained as a result of this may be the same as that of (a) of FIG. 2.

Referring to (c) of FIG. 2, the electrical resistive element 210 has a structure formed by repeating two-dimensionally a unit resistive element. The electrical resistive element 210 of (c) in FIG. 2 is comprised of numerous unit resistive elements, and thus is very insensitive to a process error.

Figure 3:
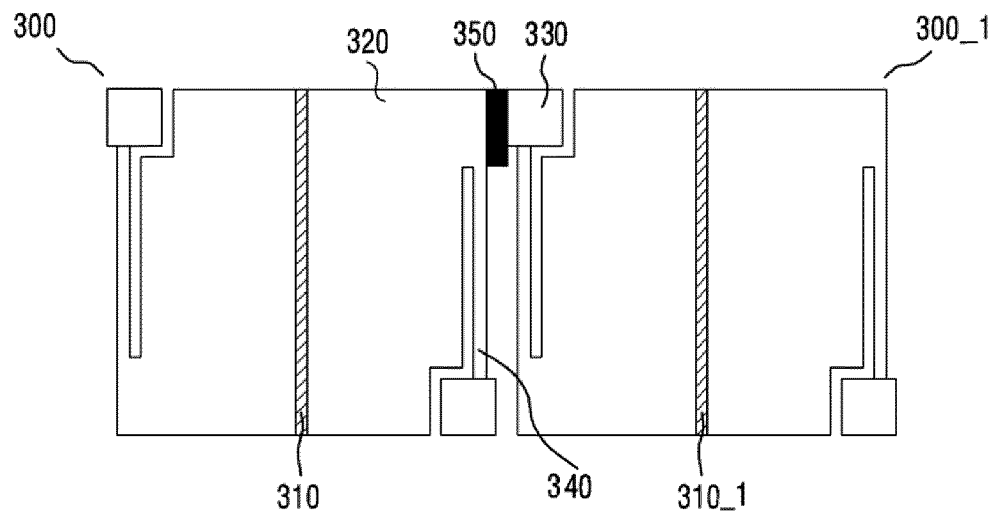
FIG. 3 shows a structure of a warm cell capable of reducing a thermal resistance in accordance with the embodiment of the present invention.

FIG. 3 shows a structure of the warm cell capable of reducing a thermal resistance in accordance with the embodiment of the present invention.

The infrared detector according to the embodiment of the present invention may include the micro-bolometer active cell 200 which detects the infrared and output the current signal, and the warm cell 300 which has the same structure and electrical characteristics as those of the micro-bolometer active cell 200 and generates a reference current signal for the micro-bolometer active cell 200.

The infrared detector according to the embodiment of the present invention is basically the same as the active cell 200 and may further include a heat transfer path so as to easily reduce only the thermal resistance. Heat can be easily transferred from the warm cell 300 to the substrate (not shown) through the heat transfer path. As shown in FIG. 3, the infrared detector may further include heat transfer material 350 allowing the heat to be rapidly discharged to the outside from the warm cell 300 that generates a reference current for the micro-bolometer active cell 200. Substantially, a deposited thermal conductivity thin film is removed in the active cell 200. Instead of this, the deposited thermal conductivity thin film may be left as it is without being removed. The warm cell 300 is required to discharge the heat more rapidly to the outside than the micro-bolometer active cell 200. The warm cell 300 according to the embodiment of the present invention has the same structure as that of the micro-bolometer active cell 200 in order to improve the matching characteristics with the micro-bolometer active cell 200, and moreover, the warm cell 300 may be designed not to remove the heat transfer material 350, i.e., a nitride film, an oxide film, etc., which is used to manufacture the active cell 200, to reduce only the thermal resistance.

Figure 4:
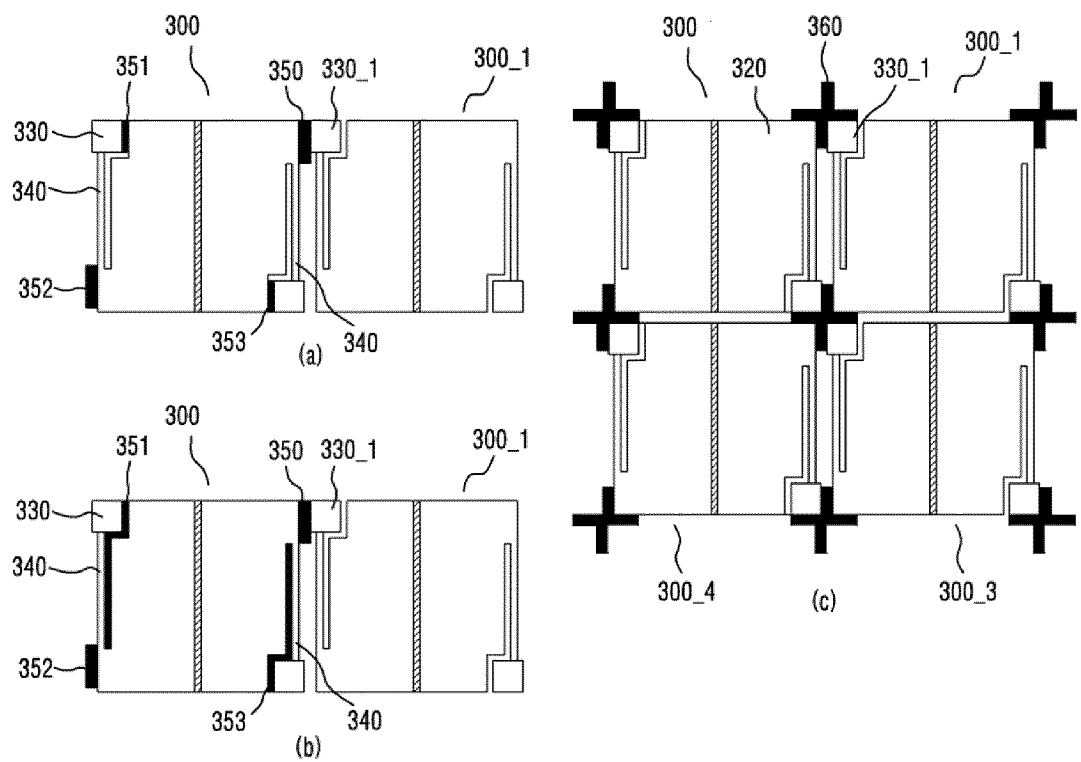
FIG. 4 shows structures of a variety of the warm cells capable of reducing the thermal resistance in accordance with the embodiment of the present invention.

FIG. 4 shows structures of a variety of the warm cells capable of reducing the thermal resistance in accordance with the embodiment of the present invention. As shown in (a) and (b) of FIG. 4, heat transfer materials 351 and 353 may be formed at least one of between a body 320 and an anchor 330 of the warm cell 300 and between the body 320 and a leg 440 of the warm cell 300.

Also, as shown in FIG. 3 and (c) of FIG. 4, in the warm cell 300 according to the embodiment of the present invention, the heat transfer materials 350, 353 and 360 may be formed in the corner of the warm cell 300 respectively. As shown in FIG. 3 and (a) and (b) of FIG. 4, the heat transfer material 350 may be formed in common between the body 320 of the warm cell 300 and an anchor 330_1 of a warm cell 300_1 adjacent to the warm cell 300.

It is shown in (c) of FIG. 4 that the heat transfer material 360 is formed in common between the warm cells 300, 300_1, 300_3 and 300_4 which are adjacent to each other in one corner.

Here, the reference cell may generate the reference signal for the micro-bolometer active cell 200 by using one unit warm cell 300 or may generate the reference signal for the micro-bolometer active cell 200 by connecting in series and in parallel a plurality of the unit warm cells. In the latter case, the resistance value is maintained to be the same as that of one electrical resistive element 110 and 210 of the micro-bolometer active cells 100 and 200 shown in FIGS. 1 and 2, and the overall thermal resistance value and 1/f noise of the warm cell 300 can be greatly reduced.

Figure 5:
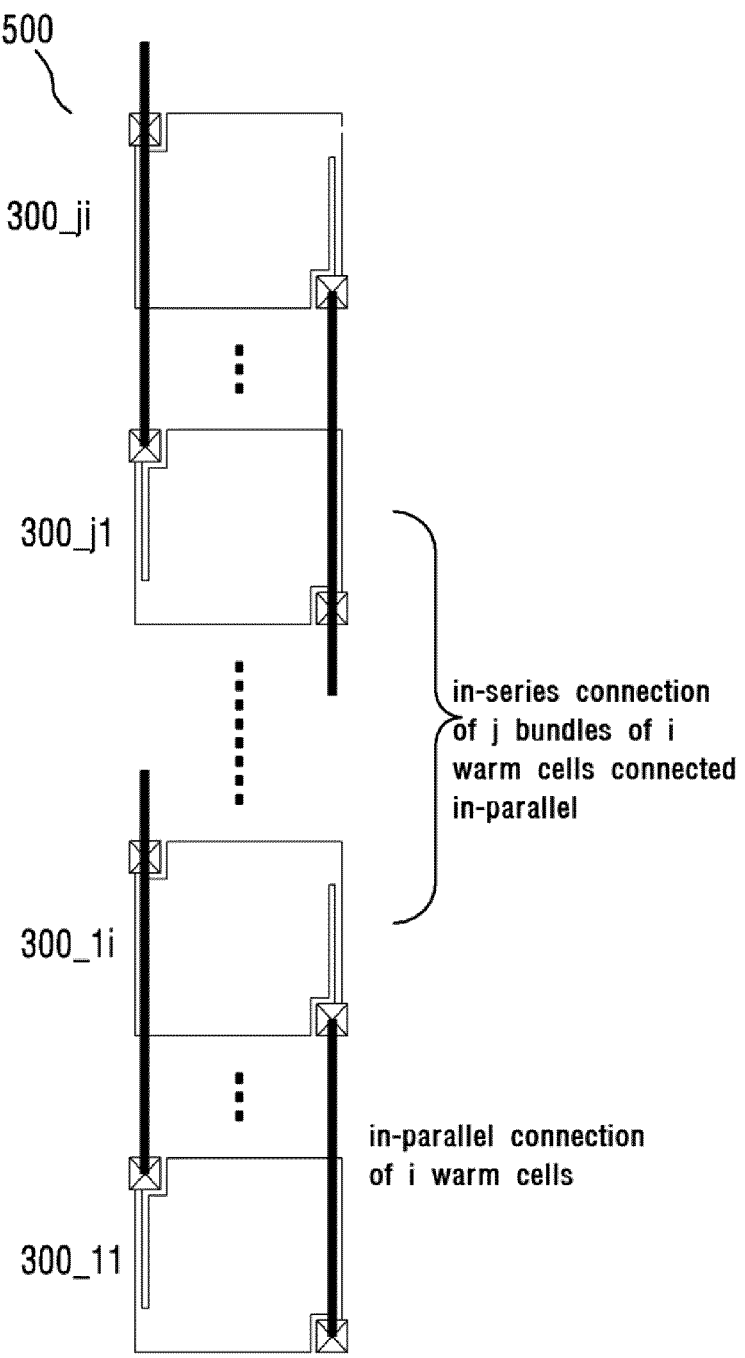
FIG. 5 shows a reference cell comprised of the warm cells arranged in the form of an array in accordance with the embodiment of the present invention.

FIG. 5 shows a reference cell 500 having a warm cell array structure in accordance with the embodiment of the present invention. As shown in FIG. 5, the reference cell 500 according to the embodiment of the present invention may include the warm cell array structure in which bundles of i number of in-parallel connected unit warm cells are connected in-series j times. For example, first i number of the warm cells 300_11 to 300_1i are connected in parallel to each other, and in the same way, j-th i number of the warm cells 300_j1 to 300_ji are connected in parallel to each other. As such, j number of the in-parallel connected warm cell bundles are connected in series to each other. The reference cell 500 formed in the warm cell array structure has a resistance value j/i times as much as that of the unit warm cell and has a resistive element area j*i times as much as that of the unit warm cell. As a result, the 1/f noise characteristics and uniformity can be improved j*i times as much as those of the unit warm cell.

Figure 6:
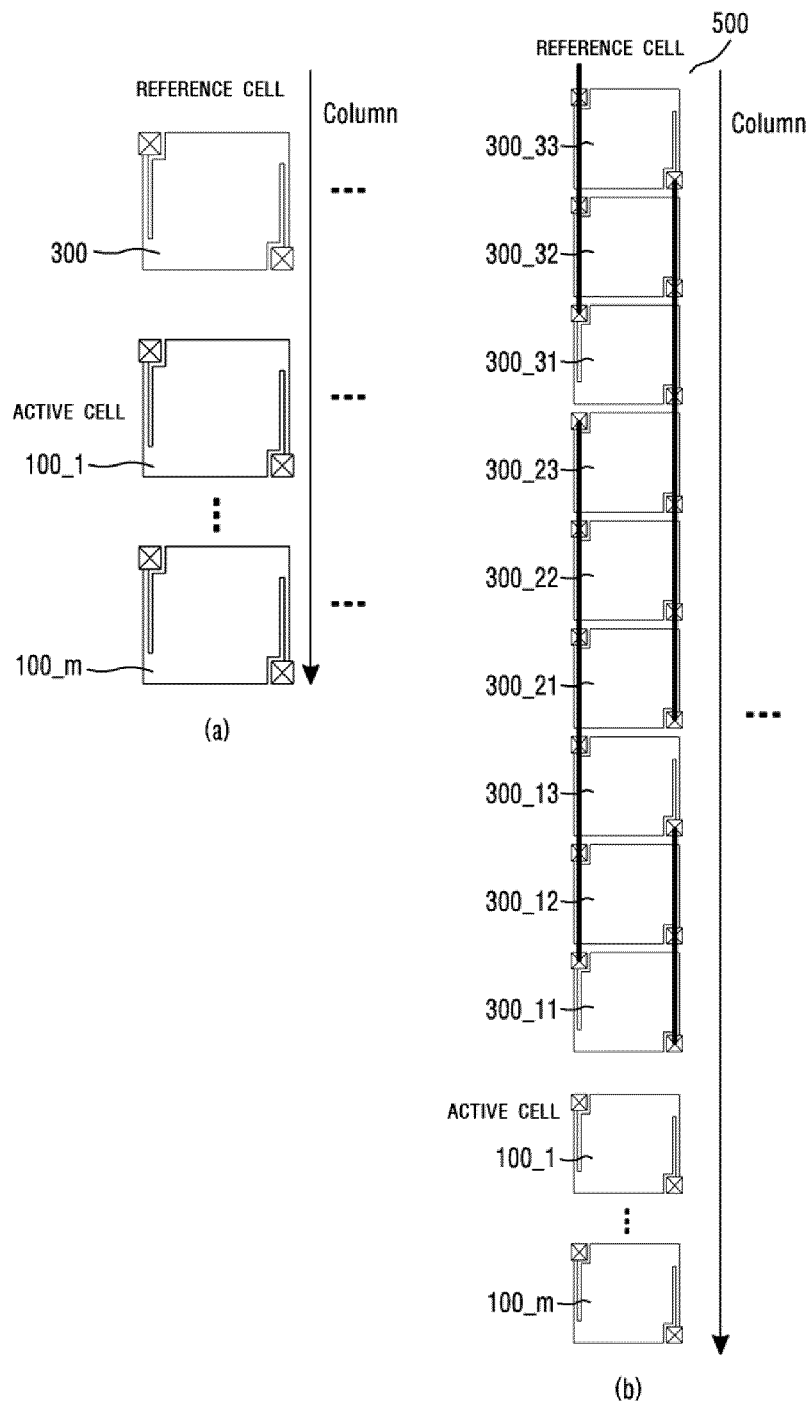
FIG. 6 shows the reference cell comprised of the warm cells arranged in the form of an array in accordance with the embodiment of the present invention and a reference cell comprised of conventional unit warm cells.

FIG. 6 shows the reference cell comprised of the warm cells arranged in the form of an array in accordance with the embodiment of the present invention and a reference cell comprised of conventional unit warm cells. In FIG. 6, it is shown that the reference cell is shared by a plurality of the micro-bolometer active cells 200_1 to 200_m. For example, in (a) of FIG. 6, the reference current signal from the reference cell may be used to remove DC bias signals for each of the plurality of the micro-bolometer active cells 200_1 to 200_m connected to the same reference cell. Also, similarly, in (b) of FIG. 6, the reference current signal from the reference cell 500 comprised of a plurality of the unit warm cells 300_11 to 300_33 may be used to remove DC bias signals of each of the plurality of the micro-bolometer active cells 200_1 to 200_m. Here, the plurality of the micro-bolometer active cells 200_1 to 200_m may be located in the same column or the same row of the M×N micro-bolometer array.

As shown in (a) of FIG. 6, when the one unit warm cell 300 is used as the reference cell, a large process error may occur in the reference cell and self-heating characteristics may be fixed. Also, since the area of the electrical resistive element is small, 1/f noise of the reference cell is added to the 1/f noise of the micro-bolometer active cell 200 and may be reflected as it is in the output signal.

In contrast to this, as shown in (b) of FIG. 6, when the reference cell 500 comprised of the unit warm cells 300_11 to 300_ii arranged in the form of i array, the resistance value can be maintained to be the same as that of the electrical resistive elements 110 and 210 of the micro-bolometer active cells 100 and 200 shown in FIG. 1 or 2 and the 1/f noise and process error can be greatly reduced. Further, the self-heating can be considerably reduced. The cause of the self-heating effect compensation will be described with reference to FIG. 7. The structure of the reference cell 500 in case of i=3 is shown in (b) of FIG. 6.

FIG. 7 is a graph showing time-dependent temperature change from a point of time when a direct current voltage is applied to the reference cell and the micro-bolometer active cell according to the embodiment of the present invention. In FIG. 7, except for an infrared signal from the outside, the self-heating of the micro-bolometer active cell 200 and the self-heating of the reference cell for the micro-bolometer active cell 200 are shown depending on time-dependent temperature change. Both of the micro-bolometer active cell 200 and the reference cell have a property of being saturated after a certain period of time. In FIG. 7, the micro-bolometer active cell 200 is represented by "Active" and the reference cell is represented by "Warm". The reference cell comprised of the warm cell 300 according to the embodiment of the present invention transfers the heat more rapidly to the substrate (not shown) than the micro-bolometer active cell 200, and thus, the temperature rise saturation velocity by the self-heating is high. When the signal for the active cell 200 is sampled such that the saturated self-heating temperature of the reference cell is the same as the average self-heating temperature of the active cell 200, that is to say, such that the average self-heating amount of the micro-bolometer active cell 200 is the same as the self-heating amount of the reference cell, the self-heating effect can be compensated. This is in contrast with a case where a cold cell is used as the reference cell. The cold cell is designed never to generate the self-heating, so that it is not possible to compensate the self-heating effect of the active cell.

However, as shown in (a) of FIG. 6, when one unit warm cell 300 is used as the reference cell, it is difficult to make the temperature increases caused by both the self-heating of the micro-bolometer active cell 200 and the self-heating of the reference cell equal to each other. A condition of completely compensating the self-heating is $\Delta T_{warm} = \Delta T_{active}$. When only one unit warm cell 300 is used, i=1. Therefore, the temperature change of the unit warm cell may be represented by the following equation (1).

$$\Delta T_{warm} = \frac{IV \cdot R_{th,warm}}{1} \qquad \text{equation (1)}$$

Here, $R_{th,warm}$ represents the thermal resistance of the unit warm cell. V and I represent respectively a DC voltage and current which are applied to the unit warm cell. However, in equation (1), since all of the parameters as well as the thermal resistance are fixed, the temperature increase of the reference cell cannot be controlled, and thus, there is a difficulty in completely compensating the self-heating effect.

Therefore, as shown in FIG. 5 and (b) of FIG. 6 in the present invention, the array structure in which the plurality of the unit warm cells can be appropriately arranged is used as the reference cell 500. This can be generalized as shown in FIG. 5. That is, the reference cell 500 according to the embodiment of the present invention may have a structure in which the plurality of the unit warm cells 300_11 to 300_ij arranged in the form of i*j array are connected in series and in parallel. As a result, through a condition derived from the following equation (2), it is possible to thoroughly compensate the influence of the self-heating.

$$\Delta T_{warm} = \Delta T_{active} \qquad \text{equation (2)}$$
$$\frac{IV \cdot t_{int}}{2C_{th,active}} = \frac{IV \cdot R_{th,warm}}{i*j} \longrightarrow R_{th,warm} \cdot C_{th,active} = \frac{i*j}{2} t_{int}$$

Here, $t_{int}$ represents time required for detecting a signal of the one micro-bolometer active cell 200 by an integrator (not shown) which integrates a signal generated from the micro-bolometer active cell 200, that is, represents an integration time. $C_{th,active}$ represents a heat capacitor of the micro-bolometer active cell 200. For example, when it is assumed that a thermal time constant of $R_{th}*C_{th}$ is 288 μsec and the integration time of $t_{int}$ is 64 μsec, i=j=3 can be induced. In this case, a structure in which the plurality of the unit warm cells are arranged in the form of 3×3 array with three series connections and three parallel connections is used as the reference cell 500, so that the self-heating effect can be completely compensated.

The reference cells 500 included in the infrared detector according to the embodiment of the present invention may be formed to include any number of the unit warm cells 300_11 to 300_ij and may be implemented such that only the necessary unit warm cells are used according to the values of i, j determined by equation (2) for every embodiment. For example, it is possible to configure such that the on and off of each of the plurality of the unit warm cells 300_11 to 300_ij shown in FIG. 5 and the connections between the plurality of the unit warm cells are programmed digitally to be operable through switches. For instance, the switch may be a complementary metal-oxide semiconductor (CMOS) switch.

As described above, it is clear to those skilled in the art that the structures (shown in FIG. 2) of the warm cell and the micro-bolometer active cell 200 according to the embodiment of the present invention, the warm cell (shown in FIGS. 3 and 4) including the heat transfer material, and the reference cell (shown in FIG. 5) in which the plurality of the warm cells are arranged in the form of the array may be used in a combination thereof according to the embodiments.

With regard to the micro-bolometer array included in the infrared detector, the FPN, 1/f noise of each of the micro-bolometer active cell 200 and the reference cells 300 and 500, and matching characteristics between the micro-bolometer active cell 100 and the reference cell 200 are major factors determining the performance and yield of an entire uncooled infrared thermal imaging system. By improving the above-mentioned characteristics, it is possible to reduce significantly the load of a detection circuit and to enhance the thermal image quality.

As described above, the embodiment of the present invention intends to optimize the structures of the micro-bolometer active cell 200, the unit warm cell 300 and the reference cells 300 and 500 for the purpose of improving the FPN, 1/f noise, and matching characteristics between the micro-bolometer active cell 200 and the reference cells 300 and 500. At present, commercialized products forming a market of an uncooled infrared camera which makes use of the micro-bolometer are very expensive, so that price competitiveness is very important so as to enter and lead the market. Therefore, through the structural optimization and array arrangement according to the embodiment of the present invention, the yield which is a major factor in a future business step can be improved at a low cost. Also, the embodiment of the present invention allows a high performance product to be manufactured at a low cost, thereby leading the future market with higher price competitiveness than that of other product group.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:
1. An infrared detector comprising:
    a micro-bolometer active cell which detects infrared and outputs a current signal; and
    a reference cell which comprises at least one warm cell and generates a reference current signal for the micro-bolometer active cell, wherein each of the active cell and the warm cell comprises an electrical resistive element, wherein the electrical resistive element consists of a repetitive pattern of a unit electrical resistive element.

2. The infrared detector of claim 1, wherein each of the active cell and the warm cell comprises a body, two legs extending from both ends of the body, and an anchor attached respectively to ends of the two legs, and wherein the body, legs, anchor and electrical resistive element of the active cell are same with the body, legs, anchor and electrical resistive element of the warm cell.

3. The infrared detector of claim 2, wherein the reference cell comprises a plurality of the warm cells, and wherein the reference cell further comprises a heat transfer material which is formed to contact with the anchors of the at least two among the plurality of the warm cells.

4. The infrared detector of claim 2, wherein the warm cell further comprises a heat transfer material which is formed at least one of between the body and the anchor of the warm cell and between the body and the leg of the warm cell.

5. The infrared detector of claim 1, wherein the electrical resistive element has a structure in which M number of bundles each of which has N number of the unit electrical resistive elements connected in parallel are connected in series, wherein the electrical resistive element has an electrical resistance value which is M/N times of an electrical resistance value of the unit electrical resistive element, and wherein each of N and M is an integer equal to or greater than 1.

6. The infrared detector of claim 1, wherein the reference cell comprises a plurality of the warm cells, wherein the plurality of the warm cells are connected in series or parallel with each other in a warm cell array structure such that an electrical resistance value of the reference cell is same as an electrical resistance value of the warm cell and a thermal resistance value of the reference cell is different from a thermal resistance value of the warm cell.

7. An infrared detector comprising:

a micro-bolometer active cell which detects infrared and outputs a current signal; and a reference cell which comprises at least one warm cell having the same electrical characteristics as electrical characteristics of the micro-bolometer active cell and further comprises a heat transfer material in a structure of the micro-bolometer active cell, and generates a reference current signal for the micro-bolometer active cell, wherein the micro-bolometer active cell and the warm cell comprise an electrical resistive element respectively, and wherein the electrical resistive element has a multi-finger structure which has the same resistance value as a resistance value of an electrical resistive element having a length L and a width W and has an area larger than an area of the electrical resistive element having the length L and the width W.

8. An infrared detector comprising:

a micro-bolometer active cell which detects infrared and outputs a current signal; and a reference cell which comprises at least one warm cell having the same electrical characteristics as electrical characteristics of the micro-bolometer active cell and further comprises a heat transfer material in a structure of the micro-bolometer active cell, and generates a reference current signal for the micro-bolometer active cell, wherein the micro-bolometer active cell and the warm cell comprise an electrical resistive element respectively, and wherein the electrical resistive element has an array structure formed by repeating two-dimensionally a unit resistive pattern, has the same resistance value as a resistance value of an electrical resistive element having a length L and a width W, and has an area larger than an area of the electrical resistive element having the length L and the width W.

9. An infrared detector comprising:

a micro-bolometer active cell which detects infrared and outputs a current signal; and a reference cell which generates a reference current signal for the micro-bolometer active cell, wherein the reference cell comprises a plurality of unit warm cells in a warm cell array structure in which j number of bundles each of which has i number of the unit warm cells connected in parallel are connected in series, wherein the reference cell has an electrical resistance value which is j/i times of an electrical resistance value of the unit warm cell, wherein the reference cell has a thermal resistance value which is 1/(j*i) times of a thermal resistance value of the unit warm cell, and wherein each of the i and j is an integer equal to or greater than 1.

10. The infrared detector of claim 9, wherein on and off of each of the plurality of the unit warm cells and connections between the plurality of the unit warm cells are controlled by a digital signal.

11. The infrared detector of claim 9, wherein each of the active cell and the unit warm cells comprises a body, two legs extending from both ends of the body, an anchor attached respectively to ends of the two legs, and an electrical resistive element, and wherein the body, legs, anchor and electrical resistive element of the active cell are same as the body, legs, anchor and electrical resistive element of the unit warm cell.

12. The infrared detector of claim 11, wherein further comprising a heat transfer material which is formed to contact with the anchors of the at least two among the plurality of the warm cells.

13. The infrared detector of claim 11, wherein the unit warm cell further comprises a heat transfer material which is formed at least one of between the body and the anchor of the warm cell and between the body and the leg of the warm cell.

14. The infrared detector of claim 9, wherein an electrical resistance value of the active cell is same as the electrical resistance value of the reference cell.

15. The infrared detector of claim 9, wherein each of the active cell and the unit warm cell comprises an electrical resistive element, wherein the electrical resistive element consists of a repetitive pattern of a unit electrical resistive element.

16. The infrared detector of claim 15, wherein the electrical resistive element has a structure in which M number of bundles each of which has N number of the unit electrical resistive element connected in parallel are connected in-series, wherein the electrical resistive element has an electrical resistance value which is M/N times of an electrical resistance value of the unit electrical resistive element, and wherein each of the N and M is an integer equal to or greater than 1.

17. An infrared detector comprising:
a micro-bolometer active cell which detects infrared and outputs a current signal; and
a reference cell which comprises a plurality of connected warm cells having the same structure and electrical characteristics as those of the micro-bolometer active cell, has the same electrical resistance value and average self-heating amount as those of the micro-bolometer active cell, and generates a reference current signal for the micro-bolometer active cell,
wherein the micro-bolometer active cell and the warn cell comprise an electrical resistive element respectively, and wherein the electrical resistive element has a multi-finger structure which has the same resistance value as a resistance value of an electrical resistive element having a length L and a width W and has an area larger than an area of the electrical resistive element having the length L and the width W.

18. An infrared detector comprising:
a micro-bolometer active cell which detects infrared and outputs a current signal; and
a reference cell which comprises a plurality of connected warm cells having the same structure and electrical characteristics as those of the micro-bolometer active cell, has the same electrical resistance value and average self-heating amount as those of the micro-bolometer active cell, and generates a reference current signal for the micro-bolometer active cell,
wherein the micro-bolometer active cell and the warm cell comprise an electrical resistive element respectively, and wherein the electrical resistive element has an array structure formed by repeating two-dimensionally a unit resistive pattern, has the same resistance value as a resistance value of an electrical resistive element having a length L and a width W and has an area larger than an area of the electrical resistive element having the length L and the width W.

* * * * *